US012607918B2

(12) United States Patent
Wakabayashi et al.

(10) Patent No.: US 12,607,918 B2
(45) Date of Patent: Apr. 21, 2026

(54) DISPLAY DEVICE WITH VAPOR CHAMBER HOUSING PHASE-CHANGEABLE WORKING FLUID

(71) Applicant: SEIKO EPSON CORPORATION, Tokyo (JP)

(72) Inventors: Shinichi Wakabayashi, Suwa (JP); Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 482 days.

(21) Appl. No.: 18/181,816

(22) Filed: Mar. 10, 2023

(65) Prior Publication Data

US 2023/0291875 A1     Sep. 14, 2023

(30) Foreign Application Priority Data

Mar. 10, 2022    (JP) ................................. 2022-037363

(51) Int. Cl.
*G03B 21/16* (2006.01)
*H04N 9/31* (2006.01)

(52) U.S. Cl.
CPC ............. *G03B 21/16* (2013.01); *H04N 9/312* (2013.01); *H04N 9/3144* (2013.01)

(58) Field of Classification Search
CPC ............................... G03B 21/16; H04N 9/3144
See application file for complete search history.

(56) References Cited

U.S. PATENT DOCUMENTS

| | | | | | |
|---|---|---|---|---|---|
| 2004/0174679 A1* | 9/2004 | Hung | .................. | H01L 23/4006 | 257/E23.084 |
| 2004/0264144 A1* | 12/2004 | Rogers | .................. | G03B 21/16 | 348/E5.143 |
| 2005/0265001 A1* | 12/2005 | Saito | .................. | H01L 23/4006 | 257/E23.084 |
| 2006/0261457 A1* | 11/2006 | Rancuret | ............. | H01L 23/4006 | 257/679 |
| 2007/0126997 A1* | 6/2007 | Kang | .................. | G03B 21/008 | 353/99 |

(Continued)

FOREIGN PATENT DOCUMENTS

| | | |
|---|---|---|
| CN | 213880366 U | 8/2021 |
| JP | 2010032945 A | 2/2010 |

(Continued)

*Primary Examiner* — Bao-Luan Q Le
(74) *Attorney, Agent, or Firm* — Dority & Manning, P.A.

(57) ABSTRACT

A display device includes a base having a first surface, and a second surface at an opposite side to the first surface, a reflective light modulation element disposed on the first surface, and electrically coupled to the base, a drive circuit board having a third surface electrically coupled to the second surface, and a fourth surface at an opposite side to the third surface, and configured to drive the reflective light modulation element, a vapor chamber having a heat receiver, a heat radiator, and a fluid housing chamber, and a radiation member coupled to the heat radiator in a thermally-transferable manner, wherein the heat receiver has a first area opposed to the second surface, and a second area opposed to the fourth surface, and the first area projects toward the base side from the second area, and is coupled to the second surface in a thermally-transferable manner.

9 Claims, 4 Drawing Sheets

(56)  References Cited

U.S. PATENT DOCUMENTS

| | | | | |
|---|---|---|---|---|
| 2008/0030688 A1* | 2/2008 | Lee | ........................ | G03B 21/16 |
| | | | | 353/54 |
| 2009/0086171 A1* | 4/2009 | Sun | ...................... | H04N 9/3144 |
| | | | | 359/223.1 |
| 2009/0135564 A1* | 5/2009 | Chen | .................. | H05K 7/20472 |
| | | | | 361/709 |
| 2016/0344988 A1* | 11/2016 | Kase | ...................... | H05K 13/00 |
| 2017/0255006 A1* | 9/2017 | Hou | ........................ | G02B 7/181 |
| 2017/0277026 A1 | 9/2017 | Ikeo | | |
| 2019/0018307 A1* | 1/2019 | Chang | .................. | G03B 21/008 |
| 2019/0179217 A1* | 6/2019 | Tang | .................... | G03B 21/008 |
| 2019/0227415 A1 | 7/2019 | Aruga et al. | | |
| 2019/0277486 A1* | 9/2019 | Nakao | ...................... | F21V 29/58 |
| 2019/0364250 A1* | 11/2019 | Malfait | .................. | G02B 7/008 |
| 2020/0150382 A1* | 5/2020 | Yang | .................... | G03B 21/008 |
| 2020/0159097 A1* | 5/2020 | Chen | .................. | G03B 21/145 |
| 2020/0159098 A1* | 5/2020 | Chen | .................... | G03B 21/005 |
| 2020/0218141 A1* | 7/2020 | Van Rafelghem | ..... | G03B 21/16 |
| 2020/0336712 A1* | 10/2020 | Shi | ........................ | H04N 9/315 |
| 2021/0025562 A1* | 1/2021 | Sato | ........................ | F21S 41/33 |
| 2021/0152793 A1* | 5/2021 | Usami | .................... | G03B 21/16 |
| 2023/0089340 A1* | 3/2023 | Fang | ...................... | H01L 23/38 |
| | | | | 136/204 |

FOREIGN PATENT DOCUMENTS

| | | | |
|---|---|---|---|
| JP | 2017182047 A | 10/2017 |
| JP | 2019-128465 A | 8/2019 |
| JP | 2021-156517 A | 10/2021 |

* cited by examiner

DISPLAY DEVICE WITH VAPOR CHAMBER HOUSING PHASE-CHANGEABLE WORKING FLUID

The present application is based on, and claims priority from JP Application Serial Number 2022-037363, filed Mar. 10, 2022, the disclosure of which is hereby incorporated by reference herein in its entirety.

BACKGROUND

1. Technical Field

The present disclosure relates to a display device.

2. Related Art

In the past, there has been known a projector which modulates light emitted from a light source using a light modulation element to form image light, and then projects the image light thus formed. In such a projector, since the light modulation element is a component in which deterioration with heat apt to occur, it is necessary to efficiently cool the light modulation element. To cope with such a problem, there is known a projection-type display device which radiates heat generated in the light modulation element using a heatsink coupled to the light modulation element (see, e.g., JP-A-2010-32945 (Document 1)).

In the projection-type display device described in Document 1, as a light modulation device, there is adopted a DMD (Digital Micromirror Device) element which is a reflective light modulation element. In the DMD element, on a rear surface at an opposite side to a front surface which the light enters, there is disposed an element-rear-surface cooling unit. The element-rear-surface cooling unit cools the DMD element from the rear surface. The element-rear-surface cooling unit is configured by, for example, a combination of a heatsink and a fan.

However, in the element-rear-surface cooling unit described in Document 1, a surface to be coupled to the rear surface of the DMD element in the heatsink is a part of a surface at the DMD element side in the heatsink. Therefore, it is difficult for the heat transferred from the DMD element to the heatsink to be transferred to the whole of the heatsink, and there is a possibility that radiation efficiency of the heat transferred from the DMD element is not sufficiently high. In particular, when the DMD element is small, and heat density in a contact part in the heatsink with the DMD element is high, there is a problem that unevenness in the heat distribution becomes easy to occur in the heatsink, and it is difficult to raise the radiation efficiency of the heat to be transferred from the DMD element.

Therefore, there has been demanded a configuration capable of increasing the efficiency of cooling the reflective light modulation element.

SUMMARY

A display device according to an aspect of the present disclosure includes a base having a first surface, and a second surface at an opposite side to the first surface, a reflective light modulation element disposed on the first surface, and electrically coupled to the base, a drive circuit board having a third surface electrically coupled to the second surface, and a fourth surface at an opposite side to the third surface, and configured to drive the reflective light modulation element, a vapor chamber having a heat receiver configured to receive heat transferred from an outside, a heat radiator configured to radiate heat, and a fluid housing chamber configured to house a working fluid which changes from a liquid phase to a vapor phase due to the heat received by the heat receiver, and changes from the vapor phase to the liquid phase in the heat radiator, and a radiation member coupled to the heat radiator in a thermally-transferable manner, wherein the heat receiver has a first area opposed to the second surface, and a second area opposed to the fourth surface, and the first area projects toward the base side from the second area, and is coupled to the second surface in a thermally-transferable manner.

DESCRIPTION OF EXEMPLARY EMBODIMENTS

First Embodiment

A first embodiment of the present disclosure will hereinafter be described based on the drawings.

Configuration of Projector

Figure 1:
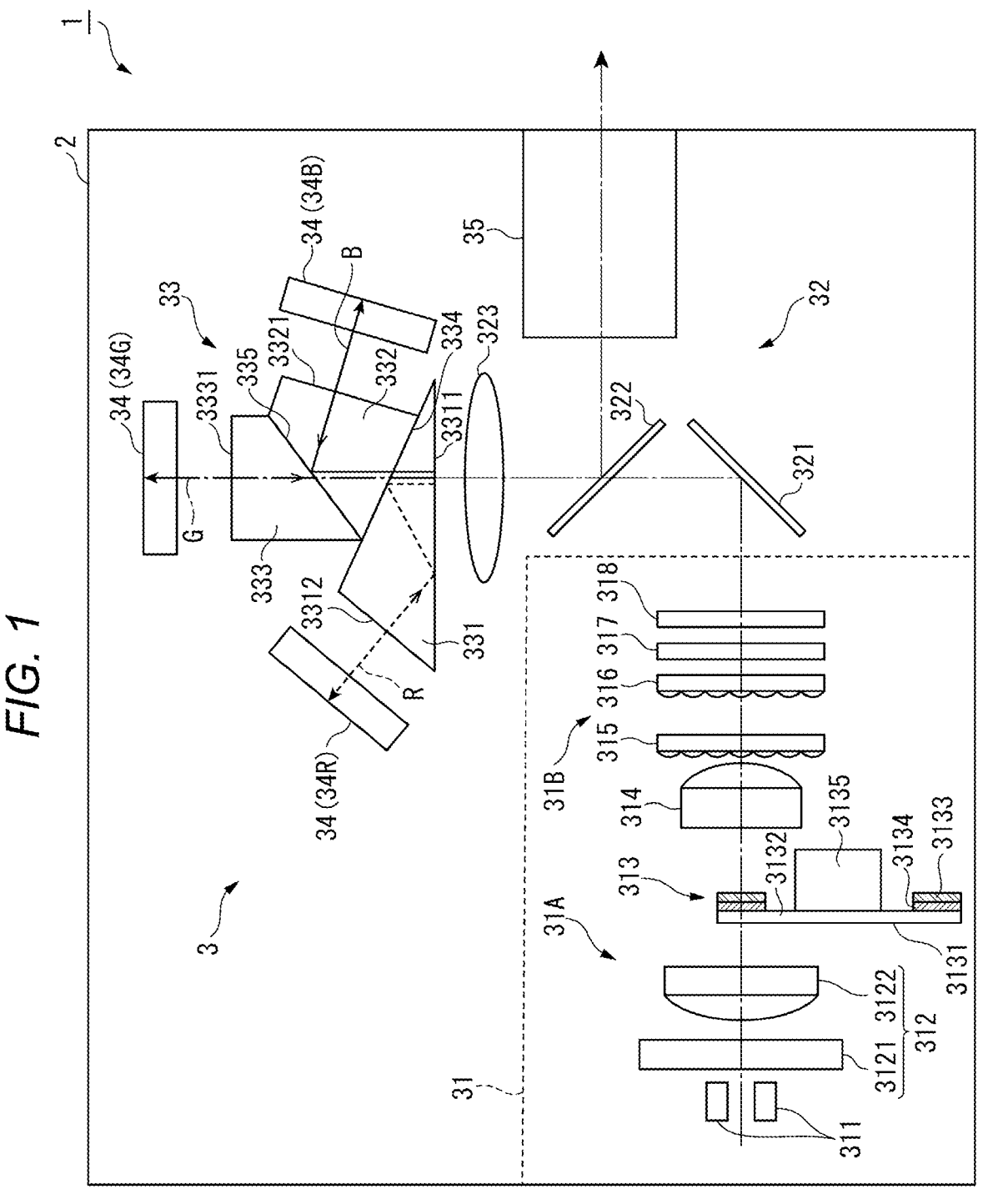
FIG. 1 is a schematic diagram showing a configuration of a projector according to a first embodiment.

FIG. 1 is a schematic diagram showing a schematic configuration of a projector 1 according to the present embodiment.

The projector 1 according to the present embodiment modulates light emitted from a light source to form image light corresponding to image information, and then projects the image light thus formed on a projection target surface such as a screen. As shown in FIG. 1, the projector 1 is provided with an exterior housing 2 forming an exterior of the projector 1, and an image projection device 3 housed in the exterior housing 2. Besides the above, although not shown in the drawings, the projector 1 is provided with a power supply device and a control device housed in the exterior housing 2. The power supply device supplies electronic components of the projector 1 with electrical power. The control device controls operations of the projector 1.

Configuration of Image Projection Device

The image projection device 3 forms the image light corresponding to an image signal input from the control device described above, and then projects the image light thus formed. The image projection device 3 is provided with an illumination device 31, a relay device 32, a dichroic prism 33, display devices 34 (34R, 34G, and 34B), and a projection optical device 35.

Configuration of Illumination Device

The illumination device 31 emits illumination light having a substantially homogenous illuminance distribution, and a uniform polarization direction to the relay device 32. In other words, the illumination device 31 emits the illumination light including red light, green light, and blue light to be modulated by the display devices 34. The illumination device 31 is provided with a light source device 31A and a homogenizing device 31B.

Configuration of Light Source Device

The light source device 31A emits light to the homogenizing device 31B. The light source device 31A has light emitting elements 311, a light collecting element 312, a wavelength conversion device 313, and a collimating lens 314.

The light emitting elements 311 are each a laser source for emitting a laser beam. In the present embodiment, the laser beam to be emitted by each of the light emitting elements 311 is, for example, blue light a peak wavelength of which is about 445 nm. The light emitting elements 311 can be formed of a single light emitting element, or can also be constituted by a plurality of light emitting elements.

The light collecting element 312 collects light beams which enter the light collecting element 312 from the light emitting elements 311, and makes the result enter the wavelength conversion device 313. The light collecting element 312 is constituted by two lenses 3121, 3122, but the number of lenses constituting the light collecting element 312 is not limited to 2.

The wavelength conversion device 313 converts a part of the blue light entering the wavelength conversion device 313 as excitation light into the green light and the red light, and then emits light including the blue light, the green light, and the red light toward an opposite side to an incident side of the blue light. The wavelength conversion device 313 has a wavelength conversion element 3131, and a motor 3135 for rotating the wavelength conversion element 3131.

The wavelength conversion element 3131 is a transmissive wavelength conversion element for emitting converted light the wavelength of which has been converted along an incident direction of the excitation light. The wavelength conversion element 3131 has a disk 3132, a wavelength conversion layer 3133, and a selective reflecting layer 3134, and has a configuration in which the wavelength conversion layer 3133 and the selective reflecting layer 3134 are formed on the disk 3132 along a circumferential direction of the disk 3132. Among these, the wavelength conversion layer 3133 includes a phosphor for converting the wavelength of the light entering the wavelength conversion layer 3133. The selective reflecting layer 3134 is disposed at an incident side of the blue light with respect to the wavelength conversion layer 3133, transmits the blue light, and reflects the green light and the red light.

The motor 3135 rotates the wavelength conversion element 3131 around a rotational axis along the incident direction of the blue light with respect to the wavelength conversion device 313.

The collimating lens 314 collimates the light emitted from the wavelength conversion element 3131.

In such a light source device 31A, a part of the blue light emitted from the light emitting elements 311 passes through the wavelength conversion layer 3133, and the rest of the blue light is converted by the wavelength conversion layer 3133 into the green light and the red light. Out of the green light and the red light emitted from the wavelength conversion layer 3133, the green light and the red light emitted at the incident side of the blue light are reflected by the selective reflecting layer 3134. Thus, the wavelength conversion element 3131 emits white light including the blue light, the green light, and the red light toward the opposite side to the incident side of the blue light.

The white light emitted from the wavelength conversion element 3131 is collimated by the collimating lens 314, and then enters the homogenizing device 31B.

It should be noted that in the light source device 31A, there is adopted the transmissive wavelength conversion element 3131. However, this is not a limitation, it is possible for the light source device 31A to be provided with a reflective wavelength conversion element for emitting the converted light obtained by converting the wavelength of the excitation light in an opposite direction to the incident direction of the excitation light. In this case, the reflective wavelength conversion element can convert substantially all of the blue light entering the reflective wavelength conversion element into the red light and the green light, or can also convert a part of the blue light entering the reflective wavelength conversion element into the red light and the green light. In the former case, it is possible to adopt a configuration in which the light source device 31A emits white light generated by combining the green light and the red light obtained by the conversion using the reflective wavelength conversion element with the blue light.

Configuration of Homogenizing Device

The homogenizing device 31B homogenizes the illuminance distribution of the white light entering the homogenizing device 31B from the light source device 31A, and at the same time, uniforms the polarization direction of the white light to emit the result as the illumination light. The homogenizing device 31B is provided with a first lens array 315, a second lens array 316, a polarization conversion element 317, and a superimposing lens 318.

Among these, the polarization conversion element 317 converts one of linear polarization components included in the light entering the polarization conversion element 317 into the other thereof to thereby emit the light uniformed in polarization direction. The polarization conversion element 317 converts an s-polarization component to emit a p-polarization component in the present embodiment, but can be provided with a configuration of converting the p-polarization component to emit the s-polarization component.

Configuration of Relay Device

The relay device 32 guides the illumination light emitted from the illumination device 31 to the dichroic prism 33. The relay device 32 is provided with a total reflection mirror 321, a polarization split device 322, and a collimating lens 323.

The illumination light entering the total reflection mirror 321 from the illumination device 31 is reflected toward the polarization split device 322 by the total reflection mirror 321.

The polarization split device 322 is a so-called plate-type polarization beam splitter (PBS). The polarization split device 322 transmits one of p-polarized light and s-polarized light, and reflects the other thereof.

In the present embodiment, since the polarization component of the light emitted from the homogenizing device 31B is uniformed into the p-polarization component, the polarization split device 322 transmits the p-polarization component and reflects the s-polarization component. Therefore, the light having entered the polarization split device 322 from the total reflection mirror 321 is transmitted through the polarization split device 322, and then enters the dichroic prism 33 via the collimating lens 323. Meanwhile the modulated light which is modulated by the display devices 34 described later, and then enters the polarization split device 322 from the dichroic prism 33 is reflected by the polarization split device 322, and then enters the projection optical device 35.

The collimating lens 323 is arranged between the polarization split device 322 and the dichroic prism 33. The collimating lens 323 collimates the light entering the dichroic prism 33 from the polarization split device 322.

Configuration of Dichroic Prism

The dichroic prism 33 has a function of separating three colored light beams of a red light beam R, a green light beam G, and a blue light beam B included in the illumination light entering the dichroic prism 33 from the relay device 32 from each other, and then guiding the three colored light beams to the three display devices 34 (34R, 34G, and 34B), respectively. The dichroic prism 33 combines the colored light beams R, G, and B having been modulated by the display devices 34R, 34G, and 34B, respectively, and then emits image light configured with the three colored light beams R, G, and B combined with each other. In other words, the dichroic prism 33 can be said to be a color separation combination device which separates the three colored light beams R, G, and B from the illumination light, and at the same time combines the three colored light beams R, G, and B thus modulated with each other.

The dichroic prism 33 is a so-called gapless prism. The dichroic prism 33 has a first prism 331, a second prism 332, a third prism 333, a first color separation layer 334, and a second color separation layer 335, and has a configuration in which the prisms 331 through 333 are combined with each other.

The first prism 331 is formed to have a triangular prismatic shape, and is arranged at the position nearest to the collimating lens 323 out of the prisms 331 through 333. In other words, the first prism 331 is arranged at a position opposed to the collimating lens 323.

The first prism 331 has a plane of incidence/exit 3311. The illumination light collimated by the collimating lens 323 enters the plane of incidence/exit 3311. Further, plane of incidence/exit 3311 emits the image light combined by the dichroic prism 33.

The first prism 331 is bonded to the second prism 332. Between the first prism 331 and the second prism 332, there is disposed the first color separation layer 334. The first color separation layer 334 reflects the red light beam R, and transmits the green light beam G and the blue light beam B out of the light having entered the first color separation layer 334 via the plane of incidence/exit 3311.

The red light beam R reflected by the first color separation layer 334 enters the plane of incidence/exit 3311 at an angle no smaller than the critical angle. Therefore, the red light beam R is internally reflected by the plane of incidence/exit 3311, and is then emitted toward the display device 34R from an exit surface 3312 of the first prism 331.

The blue light beam B and the green light beam G having been transmitted through the first color separation layer 334 enter the second prism 332.

The second prism 332 is formed to have a quadrangular prismatic shape with a substantially trapezoidal cross-sectional shape, and is bonded to the first prism 331 and the third prism 333. Between the second prism 332 and the third prism 333, there is arranged the second color separation layer 335 which reflects the blue light beam B and transmits the green light beam G. The second color separation layer 335 and the first color separation layer 334 are tilted at respective angles different from each other with respect to a central axis of the light which enters the plane of incidence/exit 3311 from the collimating lens 323.

Out of the blue light beam B and the green light beam G which enter the second prism 332 from the first color separation layer 334, the blue light beam B is reflected by the second color separation layer 335, proceeds through the second prism 332, and is then emitted toward the display device 34B from an exit surface 3321 of the second prism 332.

Out of the blue light beam B and the green light beam G having entered the second prism 332 from the first color separation layer 334, the green light beam G is transmitted through the second color separation layer 335, and then enters the third prism 333.

The third prism 333 is formed to have a quadrangular prismatic shape with a substantially trapezoidal cross-sectional shape similarly to the second prism 332, and is bonded to the second prism 332. The green light beam G having entered the third prism 333 from the second color separation layer 335 is emitted toward the display device 34G from an exit surface 3331 which is located in a proceeding direction of the green light beam G, and is at the same time substantially parallel to the plane of incidence/exit 3311.

Further, the colored light beams R, G, and B respectively modulated by the display devices 34R, 34G, and 34B track back the paths of the respective colored light beams R, G, and B which reach the respective display devices 34R, 34G, and 34B from the plane of incidence/exit 3311, and are then combined with each other, and are emitted as the image light toward the collimating lens 323 from the plane of incidence/exit 3311.

Schematic Configuration of Display Devices

The plurality of display devices 34 each modulate corresponding one of the three colored light beams R, G, and B of red, green, and blue. The plurality of display devices 34 include the display device 34R for modulating the red light beam R, the display device 34G for modulating the green light beam G, and the display device 34B for modulating the blue light beam B. Each of the display devices 34R, 34G, and 34B emits the colored light beam thus modulated toward an opposite direction to the incident direction of the colored light beam.

The configuration of such display devices 34 will be described later in detail.

Configuration of Projection Optical Device

The image light which is reflected by the polarization split device 322, and then enters the projection optical device 35 is projected on the projection target surface by the projection optical device 35. Although the detailed illustration will be omitted, the projection optical device 35 is configured as a combination lens provided with a plurality of lenses and a lens tube for housing the plurality of lenses.

Detailed Configuration of Display Devices

Figure 2:
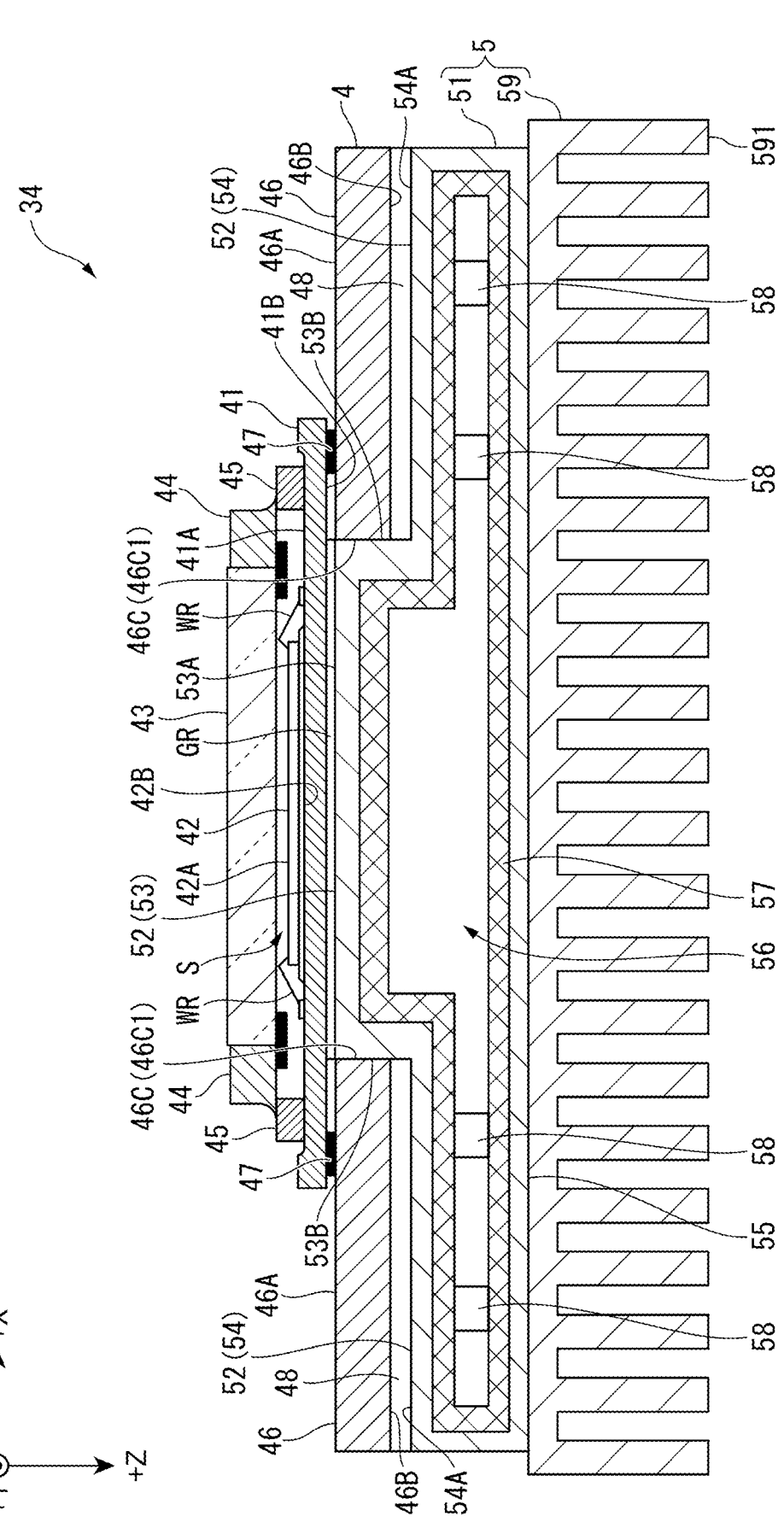
FIG. 2 is a cross-sectional view showing a display device according to the first embodiment.

FIG. 2 is a cross-sectional view showing each of the display devices 34. It should be noted that in FIG. 2, one of plurality of fins 591 of a radiation member 59 provided to the display device 34 is only attached with the reference numeral.

As described above, each of the display devices 34 modulates the colored light beam entering the display device to emit the colored light beam thus modulated toward the opposite direction to the incident direction of the colored light beam. As shown in FIG. 2, the display devices 34 are each provided with a configuration in which a light modulator 4 and a cooler 5 are combined with each other.

Configuration of Light Modulator

The light modulator 4 modulates the colored light entering the light modulator 4. The light modulator 4 has a base 41, a reflective light modulation element 42, a light transmissive member 43, a support frame 44, welding members 45, a drive circuit board 46, junctions 47, and an intervening member 48.

It should be noted that in the following description, three directions perpendicular to each other are defined as a +X direction, a +Y direction, and a +Z direction, respectively. Further, the +Z direction is defined as a direction in which the colored light beams enter the display devices 34, and two directions perpendicular to the +Z direction, and perpendicular to each other are defined as the +X direction and the +Y direction. Further, although not shown in the drawings, a direction which is an opposite direction to the +Z direction and in which the colored light beam thus modulated is emitted is defined as a −Z direction, an opposite direction to the +X direction is defined as a −X direction, and an opposite direction to the +Y direction is defined as a −Y direction.

Configuration of Base

The base 41 is a substrate including, for example, aluminum nitride, and supports the reflective light modulation element 42. The base 41 has a support surface 41A and a contact surface 41B.

The support surface 41A corresponds to a first surface. The support surface 41A is a surface facing to the −Z direction in the base 41, and the base 41 supports the reflective light modulation element 42 and the support frame 44 with the support surface 41A.

The contact surface 41B corresponds to a second surface. The contact surface 41B is a surface facing to the +Z direction in the base 41, and a first area 53 of a vapor chamber 51 described later makes contact with the contact surface 41B.

Configuration of Reflective Light Modulation Element

The reflective light modulation element 42 modulates the colored light beam entering the reflective light modulation element 42 pixel by pixel, and then emits the colored light beam thus modulated toward the opposite direction to the incident direction of the colored light beam. The reflective light modulation element 42 is arranged on the support surface 41A of the base 41, and is electrically coupled to the base 41 via wires WR. In the present embodiment, the reflective light modulation element 42 is formed of a DMD element.

The reflective light modulation element 42 has an exit surface 42A and an opposed surface 42B.

The exit surface 42A is a surface which the colored light beam enters, and is a surface from which the colored light beam modulated is emitted. In other words, the exit surface 42A is an image exit surface for emitting the image in the reflective light modulation element 42.

The opposed surface 42B is a surface at an opposite side to the exit surface 42A. The opposed surface 42B is opposed to the support surface 41A of the base 41.

Configuration of Light Transmissive Member

The light transmissive member 43 is a plate-like member which has light permeability, and which is formed to have a rectangular shape viewed from the −Z direction. The light transmissive member 43 is arranged on a light path of the colored light beam entering the reflective light modulation element 42, and is at the same time arranged on a light path of the colored light beam emitted from the reflective light modulation element 42. Specifically, the light transmissive member 43 is opposed to the exit surface 42A of the reflective light modulation element 42, and is disposed at an opposite side to the base 41 with respect to the reflective light modulation element 42. In particular, when viewed from the −Z direction, the light transmissive member 43 is disposed at a position where the light transmissive member 43 covers a whole of the reflective light modulation element 42. Such a light transmissive member 43 is supported by the support frame 44.

Configuration of Support Frame and Welding Members

The support frame 44 is welded to the base 41 using the welding members 45 in a state of supporting the light transmissive member 43. In other words, the support frame

44 supports the light transmissive member 43, and is disposed on the base 41. It should be noted that the welding members 45 are formed of a metal material such as solder. In other words, the welding members 45 have thermal conductivity.

The support frame 44 makes contact with a side surface along a circumferential direction around an axis along the +Z direction in the light transmissive member 43. Specifically, the support frame 44 makes contact with the side surfaces in the +X directions and the +Y directions in the light transmissive member 43 having a rectangular shape. Further, a surface in the +Z direction in the support frame 44 is welded to the base 41 using the welding members 45. Therefore, a space S surrounded by the support surface 41A of the base 41, the light transmissive member 43, the support frame 44, and the welding members 45 is sealed.

Here, the support frame 44 can be formed of metal having thermal conductivity. Thus, a part of the heat generated by the reflective light modulation element 42 is transferred to the light transmissive member 43 and the support frame 44 via a gas in the space S. The heat transferred to the light transmissive member 43 is transferred to the support frame 44. The heat transferred to the support frame 44 is transferred to the base 41 via the welding members 45.

Configuration of Drive Circuit Board and Junction

The drive circuit board 46 is a board which is electrically coupled to the base 41, which drives the reflective light modulation element 42 disposed on the base 41, and which is formed of, for example, glass epoxy resin. The drive circuit board 46 is arranged at the +Z direction side with respect to the base 41. In other words, the drive circuit board 46 is disposed at an opposite side to the reflective light modulation element 42 with respect to the base 41.

The drive circuit board 46 has a mounting surface 46A, an opposed surface 46B, and an insertion target part 46C.

The mounting surface 46A corresponds to a third surface. The mounting surface 46A is a surface facing to the −Z direction in the drive circuit board 46, and is electrically coupled to the contact surface 41B of the base 41 via the junction 47. The junction 47 is formed of metal having thermal conductivity in addition to electrical conductivity.

The opposed surface 46B corresponds to a fourth surface. The opposed surface 46B is a surface facing to the +Z direction in the drive circuit board 46, and is opposed to the vapor chamber 51 of the cooling part 5 in the +Z direction.

The insertion target part 46C is a portion where the first area 53 described later is inserted in the −Z direction in the vapor chamber 51. In the present embodiment, the insertion target part 46C is a through opening penetrating the drive circuit board 46 along the +Z direction, and the first area 53 of the vapor chamber 51 is inserted through the insertion target part 46C in the −Z direction, and is coupled to the contact surface 41B of the base 41 although described later in detail. Further, inner surfaces 46C1 of the insertion target part 46C are coupled to side surfaces 53B of the first area 53 in a heat-transferable manner. In other words, the inner surfaces 46C1 opposed to the first area 53 in the insertion target part 46C are coupled to the side surfaces 53B of the first area 53 in a heat-transferable manner.

To the drive circuit board 46, there is coupled a flexible board not shown for supplying the image signal and the electrical power. The flexible board can be coupled to either one of the mounting surface 46A and the opposed surface 46B of the drive circuit board 46, but is preferably coupled to the mounting surface 46A which is not opposed to the vapor chamber 51.

Configuration of Intervening Member

The intervening member 48 is disposed at the +Z direction side of the drive circuit board 46. In other words, the intervening member 48 intervenes between the drive circuit board 46 and a second area 54 described later in the vapor chamber 51. The intervening member 48 can be formed of, for example, a thermally-conductive sheet, and can further be formed of an insulating sheet.

Configuration of Cooler

The cooler 5 cools the light modulator 4. In particular, the cooler 5 releases the heat generated by the reflective light modulation element 42 to thereby cool the reflective light modulation element 42. The cooler 5 is provided with the vapor chamber 51 and the radiation member 59.

Configuration of Vapor Chamber

The vapor chamber 51 is a heat diffusion element which diffuses the heat of the reflective light modulation element 42 transferred from the base 41 and the drive circuit board 46 to transfer the heat to the radiation member 59. A main portion of the vapor chamber 51 is arranged at the +Z direction side as an opposite side to the base 41 with respect to the drive circuit board 46. The vapor chamber 51 has a heat receiver 52 and a heat radiator 55.

The heat receiver 52 is a portion to which the heat is transferred from the outside in the vapor chamber 51. The heat receiver 52 is disposed on a surface at the −Z direction side in the vapor chamber 51. The heat receiver 52 is coupled to the light modulator 4 in a thermally-transferable manner, and receives the heat transferred from the light modulator 4. The heat receiver 52 is provided with the first area 53 and the second area 54.

When viewed from the −Z direction, the first area 53 is an area corresponding to the insertion target part 46C of the drive circuit board 46, and is opposed to the contact surface 41B. The first area 53 projects from the second area 54 toward the −Z direction side as the base 41 side, and is inserted in the −Z direction through the insertion target part 46C. In the first area 53, a coupling surface 53A as a surface at the base 41 side is a flat surface, and the coupling surface 53A is coupled to the contact surface 41B of the base 41 in a thermally-transferable manner. It should be noted that between the coupling surface 53A and the contact surface 41B, there intervenes grease GR having thermal conductivity. In other words, the display device 34 is provided with the grease GR having thermal conductivity disposed between the contact surface 41B and the coupling surface 53A which is a portion opposed to the contact surface 41B in the first area 53. To the first area 53, there is transferred the heat of the reflective light modulation element 42 from the contact surface 41B via the grease GR.

The side surfaces 53B facing to directions perpendicular to the +Z direction in the first area 53 are coupled to the inner surfaces 46C1 of the insertion target part 46C in a thermally-transferable manner. In particular, the side surfaces 53B respectively facing to the +X direction, the −X direction, the +Y direction, and the −Y direction in the first area 53 are coupled to the inner surfaces 46C1 of the insertion target part 46C in a thermally-transferable manner. Therefore, a part of the heat of the reflective light modulation element 42 transferred to the drive circuit board 46 is transferred to the first area 53 via the inner surfaces 46C1.

When viewed from the −Z direction, the second area 54 is an area corresponding to the opposed surface 46B of the drive circuit board 46, and is opposed to the opposed surface 46B. To a coupling surface 54A at the −Z direction side in the second area 54, there is coupled the intervening member 48 in a thermally-transferable manner. In other words, the second area 54 is coupled to the opposed surface 46B of the drive circuit board 46 via the intervening member 48 in a thermally-transferable manner. Therefore, another part of the heat of the reflective light modulation element 42 transferred to the drive circuit board 46 is transferred to the second area 54.

It should be noted that a distance between the second area 54 and the opposed surface 46B is longer than a distance between the first area 53 and the contact surface 41B. In other words, the distance between the first area 53 and the contact surface 41B is shorter than the distance between the second area 54 and the opposed surface 46B. Thus, it is possible to make it easy to couple the first area 53 to the base 41 which is shorter in distance from the reflective light modulation element 42 than the drive circuit board 46 in a thermally-transferable manner, and thus, it is possible to make it easy to transfer the heat generated in the reflective light modulation element 42 to the first area 53.

The heat radiator 55 is a portion for transferring the heat to the outside in the vapor chamber 51. The heat radiator 55 is disposed on a surface at the +Z direction side in the vapor chamber 51. A surface on which the heat radiator 55 is disposed in the vapor chamber 51 is a flat surface, and to the heat radiator 55, there is attached the radiation member 59 in a thermally-transferable manner.

Inside such a vapor chamber 51, there is disposed a fluid housing chamber 56 for housing a working fluid which is phase-changeable between a vapor phase and a liquid phase. Further, on an inner surface of the fluid housing chamber 56, there is disposed a mesh 57 which holds the working fluid in the liquid phase, and which is capable of transporting the working fluid in the liquid phase. In other words, the vapor chamber 51 is provided with the fluid housing chamber 56 for housing the working fluid, and the mesh 57 disposed on the inner surface of the fluid housing chamber 56.

The fluid housing chamber 56 houses the working fluid enclosed in a reduced pressure state. Out of the working fluid housed in the fluid housing chamber 56, the working fluid in the liquid phase evaporates in a portion to which heat is transferred from the outside. For example, the working fluid in the liquid phase held by the mesh 57 evaporates on the inner surface corresponding to the coupling surface 53A of the first area 53 coupled to the base 41, and the inner surface corresponding to the side surfaces 53B of the first area 53 coupled to the inner surfaces 46C1 of the drive circuit board 46 due to the heat of the reflective light modulation element 42 transferred. Further, the working fluid in the liquid phase evaporates on the inner surface corresponding to the coupling surface 54A coupled to the drive circuit board 46 in the second area 54 in a thermally-transferable manner due to the heat of the reflective light modulation element 42 transferred.

The working fluid having evaporated flows through the fluid housing chamber 56, and is then condensed in the heat radiator 55 as a portion low in heat density to change to the working fluid in the liquid phase. The working fluid having changed to the liquid phase is held by the mesh 57, and is then transported to a portion high in heat density, for example, a portion to which the heat of the reflective light modulation element 42 is transferred due to a capillary force in the mesh 57. As described above, the heat of the reflective light modulation element 42 transferred to the vapor chamber 51 is diffused to the entire area in the fluid housing chamber 56 in the form of being transferred to the working fluid, and is transferred to the outside in the heat radiator 55.

It should be noted that in the fluid housing chamber 56, there are disposed a plurality of columnar parts 58 extending along the +Z direction. In other words, the vapor chamber 51 is provided with the plurality of columnar parts 58 disposed inside the fluid housing chamber 56.

Each of the columnar parts 58 couples the inner surface corresponding to the heat receiver 52 and the inner surface corresponding to the heat radiator 55 to each other. In particular, the plurality of columnar parts 58 are disposed in accordance with the second area 54 when viewed form the +Z direction or the −Z direction. In other words, the plurality of columnar parts 58 are not disposed in the first area 53 when viewed form the +Z direction or the −Z direction.

Due to such a plurality of columnar parts 58, it is possible to ensure the strength of the vapor chamber 51.

Here, the flatness of a portion provided with the plurality of columnar parts 58 is apt to become large. In other words, the portion provided with the plurality of columnar parts 58 is difficult to become flat. In contrast, the columnar part 58 is not disposed in the first area 53. Therefore, it is possible to lower the flatness of the coupling surface 53A to be coupled to the contact surface 41B of the base 41 in a thermally-transferable manner, and thus it is possible to increase the contact area between the contact surface 41B and the coupling surface 53A. Therefore, it is possible to make it easy to transfer the heat from the base 41 to the first area 53.

Configuration of Radiation Member

The radiation member 59 is a metallic heatsink which is arranged on the heat radiator 55 in a thermally-transferable manner, and which radiates heat transferred from the vapor chamber 51. The radiation member 59 has the plurality of fins 591 extending toward an opposite side to the vapor chamber 51. Each of the fins 591 radiates the heat transferred to the radiation member 59. By the radiation member 59 being provided with the plurality of fins 591 as described above, it is possible to increase the radiation area of the heat transferred to the radiation member 59, namely the radiation area of the heat of the reflective light modulation element 42.

Advantages of First Embodiment

The projector 1 according to the present embodiment described hereinabove exerts the following advantages.

The display device 34 is provided with the base 41, the reflective light modulation element 42, the drive circuit board 46, the vapor chamber 51, and the radiation member 59.

The base 41 has the support surface 41A and the contact surface 41B at an opposite side to the support surface 41A. The support surface 41A corresponds to the first surface, and the contact surface 41B corresponds to the second surface.

The reflective light modulation element 42 is disposed on the support surface 41A, electrically coupled to the base 41, and modulates the light entering the reflective light modulation element 42.

The drive circuit board 46 has the mounting surface 46A electrically coupled to the contact surface 41B, and the opposed surface 46B at the opposite side to the mounting surface 46A, and drives the reflective light modulation element 42. The mounting surface 46A corresponds to the third surface, and the opposed surface 46B corresponds to the fourth surface.

The vapor chamber 51 has the heat receiver 52, the heat radiator 55, and the fluid housing chamber 56. The heat receiver 52 receives the heat transferred from the outside. The heat radiator 55 releases the heat. The fluid housing chamber 56 houses the working fluid which changes from the liquid phase to the vapor phase due to the heat received in the heat receiver 52, and which changes from the vapor phase to the liquid phase in the heat radiator 55.

The radiation member 59 is coupled to the heat radiator 55 in a thermally-transferable manner.

The heat receiver 52 is provided with the first area 53 and the second area 54. The first area 53 is opposed to the contact surface 41B, and the second area 54 is opposed to the opposed surface 46B. The first area 53 projects toward the base 41 side from the second area 54, and is coupled to the contact surface 41B in a thermally-transferable manner.

According to such a configuration, the heat generated in the reflective light modulation element 42 is transferred to the base 41 on which the reflective light modulation element 42 is disposed. The heat transferred to the base 41 is transferred to the first area 53 coupled to the contact surface 41B of the base 41 in a thermally-transferable manner in the vapor chamber 51. Since the fluid housing chamber 56 of the vapor chamber 51 houses the working fluid, the working fluid in the liquid phase evaporates due to the heat transferred to the first area 53 in the portion corresponding to the first area 53 in the fluid housing chamber 56. Since the working fluid in the vapor phase increases in volume to be diffused inside the fluid housing chamber 56, the heat transferred to the first area 53 is diffused inside the fluid housing chamber 56. The working fluid in the vapor phase is condensed on the inner surface of the heat radiator 55 coupled to the radiation member 59 to change to the working fluid in the liquid phase, and the working fluid in the liquid phase is transported once again to the portion corresponding to the first area 53 in the fluid housing chamber 56.

Since the heat of the reflective light modulation element 42 is diffused by the vapor chamber 51 as described above, it is possible to effectively lower the heat density of the reflective light modulation element 42. On this occasion, since the heat radiator 55 of the vapor chamber 51 is provided with the radiation member 59, it is possible to efficiently transfer the heat of the reflective light modulation element 42 to the radiation member 59 using the vapor chamber 51. Therefore, it is possible to effectively cool the reflective light modulation element 42. Further, since the configuration of the vapor chamber 51 is a configuration of confining the working fluid, it is possible to suppress an increase in size of the display devices 34.

In the display devices 34, the drive circuit board 46 has the insertion target part 46C corresponding to the reflective light modulation element 42. The first area 53 is inserted through the insertion target part 46C, and is then coupled to the contact surface 41B in a thermally-transferable manner.

According to such a configuration, even when the vapor chamber 51 is arranged at an opposite side to the base 41 with respect to the drive circuit board 46, it is possible to couple the first area 53 of the vapor chamber 51 to the contact surface 41B of the base 41 in a thermally-transferable manner. Therefore, it is possible to efficiently transfer the heat of the reflective light modulation element 42 transferred to the contact surface 41B to the vapor chamber 51, and thus, it is possible to effectively cool the reflective light modulation element 42.

In the display devices 34, the drive circuit board 46 receive the heat generated in the reflective light modulation element 42 with the mounting surface 46A via the contact surface 41B. Then, the drive circuit board 46 transfers the heat thus received to the first area 53 in the portion opposed to the first area 53 in the insertion target part 46C. The portion opposed to the first area 53 in the insertion target part 46C includes the portion opposed to the side surfaces 53B of the first area 53 projecting in the heat receiver 52.

According to such a configuration, the heat of the reflective light modulation element 42 is not only transferred to the portion opposed to the base 41 in the first area 53 via the base 41, but also transferred to the portion opposed to the insertion target part 46C in the first area 53. According to the above, since it is possible to increase the paths through which the heat is transferred from the reflective light modulation element 42 to the first area 53, it is possible to more efficiently transfer the heat of the reflective light modulation element 42 to the first area 53. Therefore, it is possible to more effectively cool the reflective light modulation element 42.

The display devices 34 are each provided with the grease GR having thermal conductivity disposed between the contact surface 41B and the coupling surface 53A which is a portion opposed to the contact surface 41B in the first area 53.

According to such a configuration, even when a gap occurs between the contact surface 41B of the base 41 and the first area 53 of the vapor chamber 51, it is possible to make it easy for the heat to be transferred from the contact surface 41B to the first area 53 due to the grease GR. Therefore, since it is possible to efficiently cool the heat of the reflective light modulation element 42 to the vapor chamber 51, it is possible to more effectively cool the reflective light modulation element 42.

In the display devices 34, the drive circuit board 46 receives the heat generated in the reflective light modulation element 42 with the mounting surface 46A via the contact surface 41B. The drive circuit board 46 transfers the heat thus received to the second area 54 of the vapor chamber 51 from the opposed surface 46B.

According to such a configuration, in the vapor chamber 51, the heat of the reflective light modulation element 42 is transferred to the first area 53 via the base 41, and further, the heat of the reflective light modulation element 42 is transferred to the second area 54 via the base 41 and the drive circuit board 46. Therefore, since it is possible to increase the paths of the heat transferred from the reflective light modulation element 42 to the vapor chamber 51, it is possible to more effectively cool the reflective light modulation element 42.

In the display devices 34, the vapor chamber 51 has the plurality of columnar parts 58 which are disposed in the fluid housing chamber 56, and which couple the inner surface corresponding to the heat receiver 52 and the inner surface corresponding to the heat radiator 55 to each other. The plurality of columnar parts 58 are disposed in accordance with the second area 54.

According to such a configuration, the strength of the vapor chamber 51 in which the working fluid evaporates and condenses can be ensured by the plurality of columnar parts 58.

It should be noted that in the portion where the plurality of columnar parts 58 are disposed in the vapor chamber 51, it is difficult to make the flatness smaller. In other words, unevenness is apt to occur in the portion where the plurality of columnar parts 58 are disposed in the vapor chamber 51. In contrast, since the portion where the plurality of columnar parts 58 are disposed in the vapor chamber 51 is the second area 54, it is possible to make it easy to make the flatness of the coupling surface 53A of the first area 53 opposed to the contact surface 41B of the base 41 smaller. Therefore, it is possible to increase the contact area between the contact surface 41B and the coupling surface 53A, and thus, it is possible to efficiently transfer the heat of the reflective light modulation element 42 from the contact surface 41B to the first area 53.

In the display devices 34, the distance between the first area 53 and the contact surface 41B is shorter than the distance between the second area 54 and the opposed surface 46B.

According to such a configuration, since the columnar part 58 is not disposed in the first area 53, even when manufacturing the plurality of columnar parts 58, the flatness of the first area 53 does not degrade. Therefore, it is possible to make it easy to couple the first area 53 to the contact surface 41B in a thermally-transferable manner. Therefore, it is possible to make it easy to transfer the heat from the reflective light modulation element 42 to the first area 53 via the base 41.

In the display devices 34, the radiation member 59 has the plurality of fins 591.

According to such a configuration, since it is possible to enlarge the radiation area of the heat transferred from the vapor chamber 51, it is possible to promote the condensation of the working fluid in the heat radiator 55 of the vapor chamber 51. Therefore, it is possible to promote the evaporation of the working fluid in the first area 53 due to the heat transferred from the reflective light modulation element 42, and by extension, it is possible to increase the cooling efficiency of the reflective light modulation element 42.

Second Embodiment

Then, a second embodiment of the present disclosure will be described.

The projector according to the present embodiment is provided with substantially the same configuration as that of the projector 1 according to the first embodiment, but is different therefrom in the configuration of the vapor chamber provided to the display devices. It should be noted that in the following description, a part which is the same or substantially the same as the part having already been described is denoted by the same reference symbol to omit the description thereof.

Schematic Configuration of Projector

Figure 3:
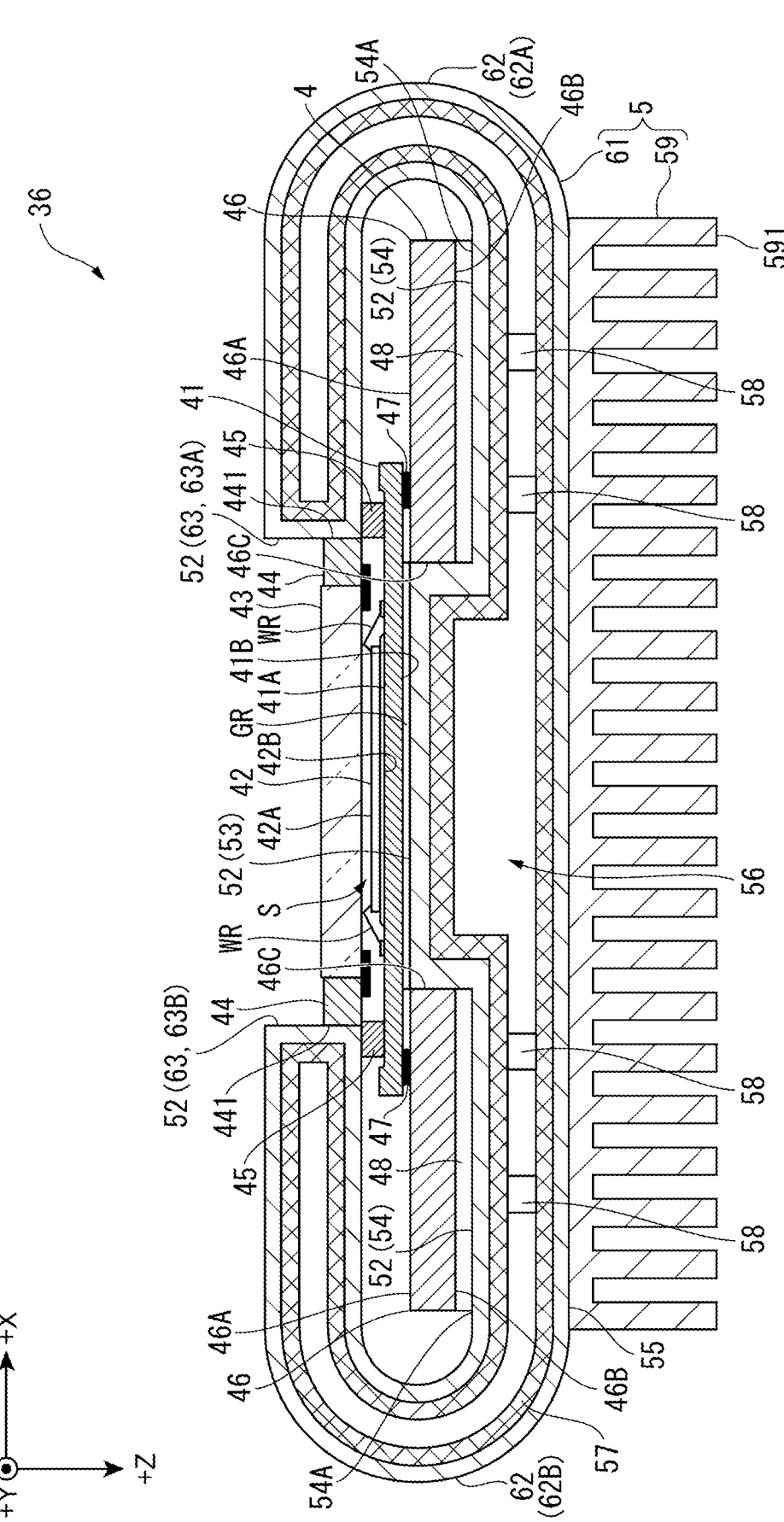
FIG. 3 is a cross-sectional view showing a display device provided to a projector according to the second embodiment.

FIG. 3 is a cross-sectional view showing a display device 36 provided to the projector according to the present embodiment.

The projector according to the present embodiment has substantially the same configuration and functions as those of the projector 1 according to the first embodiment except the point that the projector according to the present embodiment is provided with the display device 36 shown in FIG. 3 instead of the display device 34.

The display device 36 is provided with substantially the same configuration and functions as those of the display device 34 except the point that a vapor chamber 61 is provided instead of the vapor chamber 51. In other words, in the present embodiment, the display device 36 is provided with the light modulator 4, and the cooler 5 which has the vapor chamber 61 instead of the vapor chamber 51.

Configuration of Vapor Chamber

Similarly to the vapor chamber 51 in the first embodiment, the vapor chamber 61 is a heat diffusion element which is coupled to the base 41, the drive circuit board 46, and the intervening member 48 in a thermally-transferable manner, and which diffuses the heat of the reflective light modulation element 42 transferred from the base 41, the drive circuit board 46, and the intervening member 48 to transfer the heat to the radiation member 59. The vapor chamber 61 is provided with substantially the same configuration as that of the vapor chamber 51, but is different from the vapor chamber 51 in the point that a part of the vapor chamber 61 is coupled to an outer circumferential surface 441 of the support frame 44 in a thermally-transferable manner.

Specifically, the vapor chamber 61 has the heat receiver 52, the heat radiator 55, the fluid housing chamber 56, the mesh 57, and the plurality of columnar parts 58 similarly to the vapor chamber 51, and is further provided with a plurality of curved parts 62 and a plurality of coupling parts 63.

Each of the curved parts 62 is a part curved toward the −Z direction from an end portion at the opposite side to the first area 53 in the second area 54. In the example shown in FIG. 3, out of the plurality of curved parts 62, one curved part 62A extends from an end portion at the +X direction side in the second area 54 toward the −Z direction while curving outside, and then extends toward the −X direction. Further, out of the plurality of curved parts 62, one curved part 62B extends from an end portion at the −X direction side in the second area 54 toward the −Z direction while curving outside, and then extends toward the +X direction. It should be noted that although not shown in the drawings, out of the plurality of curved parts 62, another curved part 62 extends from an end portion at the +Y direction side in the second area 54 toward the −Z direction while curving outside, and then extends toward the −Y direction. Further, although not shown in the drawings, out of the plurality of curved parts 62, another curved part 62 extends from an end portion at the −Y direction side in the second area 54 toward the −Z direction while curving outside, and then extends toward the +Y direction.

It should be noted that instead of the curved parts 62, there can be disposed a bending part which bends from an end portion at the opposite side to the first area 53 in the second area 54 toward the −Z direction, and then bends again toward the base 41 and the support frame 44.

Each of the coupling parts 63 is provided to corresponding one of the curved parts 62. The coupling parts 63 are each coupled to the outer circumferential surface 441 of the support frame 44 for supporting the light transmissive member 43 in a thermally-transferable manner. For example, out of the plurality of coupling parts 63, the coupling part 63A provided to the curved part 62A is coupled to a portion at the +X direction side in the outer circumferential surface 441 of the support frame 44. Further, for example, out of the plurality of coupling parts 63, the coupling part 63B provided to the curved part 62B is coupled to a portion at the −X direction side in the outer circumferential surface 441 of the support frame 44. The same applies to the coupling parts 63 provided to other curved parts 62 out of the plurality of coupling parts 63.

The plurality of coupling parts 63 receive the heat of the reflective light modulation element 42 transferred to the support frame 44. In other words, each of the coupling parts 63 constitutes the heat receiver 52.

It should be noted that it is possible for the coupling part 63 to be coupled to the base 41 instead of, or in addition to, the support frame 44 in a thermally-transferable manner to receive the heat of the reflective light modulation element 42 transferred to the base 41. Further, the coupling part 63 can be coupled to the mounting surface 46A of the drive circuit board 46.

Advantages of Second Embodiment

The projector according to the present embodiment described hereinabove exerts the following advantages in addition to the advantages substantially the same as those of the projector 1 according to the first embodiment.

The display device 36 is provided with the light transmissive member 43 and the support frame 44. The light transmissive member 43 is opposed to the exit surface 42A as an image exit surface in the reflective light modulation element 42, and is disposed at an opposite side to the base 41 with respect to the reflective light modulation element 42. The support frame 44 supports the light transmissive member 43, and is disposed on the base 41. The vapor chamber 61 is coupled to the support frame 44 in a thermally-transferable manner to receive the heat generated in the reflective light modulation element 42.

According to such a configuration, it is possible to transfer the heat which is generated in the reflective light modulation element 42, and is transferred to the light transmissive member 43 to the vapor chamber 61 via the support frame 44. Therefore, since it is possible to increase the paths of the heat transferred from the reflective light modulation element 42 to the vapor chamber 61, it is possible to more effectively cool the reflective light modulation element 42.

Third Embodiment

Then, a third embodiment of the present disclosure will be described.

The projector according to the present embodiment is provided with substantially the same configuration as that of the projector 1 according to the first embodiment, but is different therefrom in the configuration of the radiation member. It should be noted that in the following description, a part which is the same or substantially the same as the part having already been described is denoted by the same reference symbol to omit the description thereof.

Schematic Configuration of Projector

Figure 4:
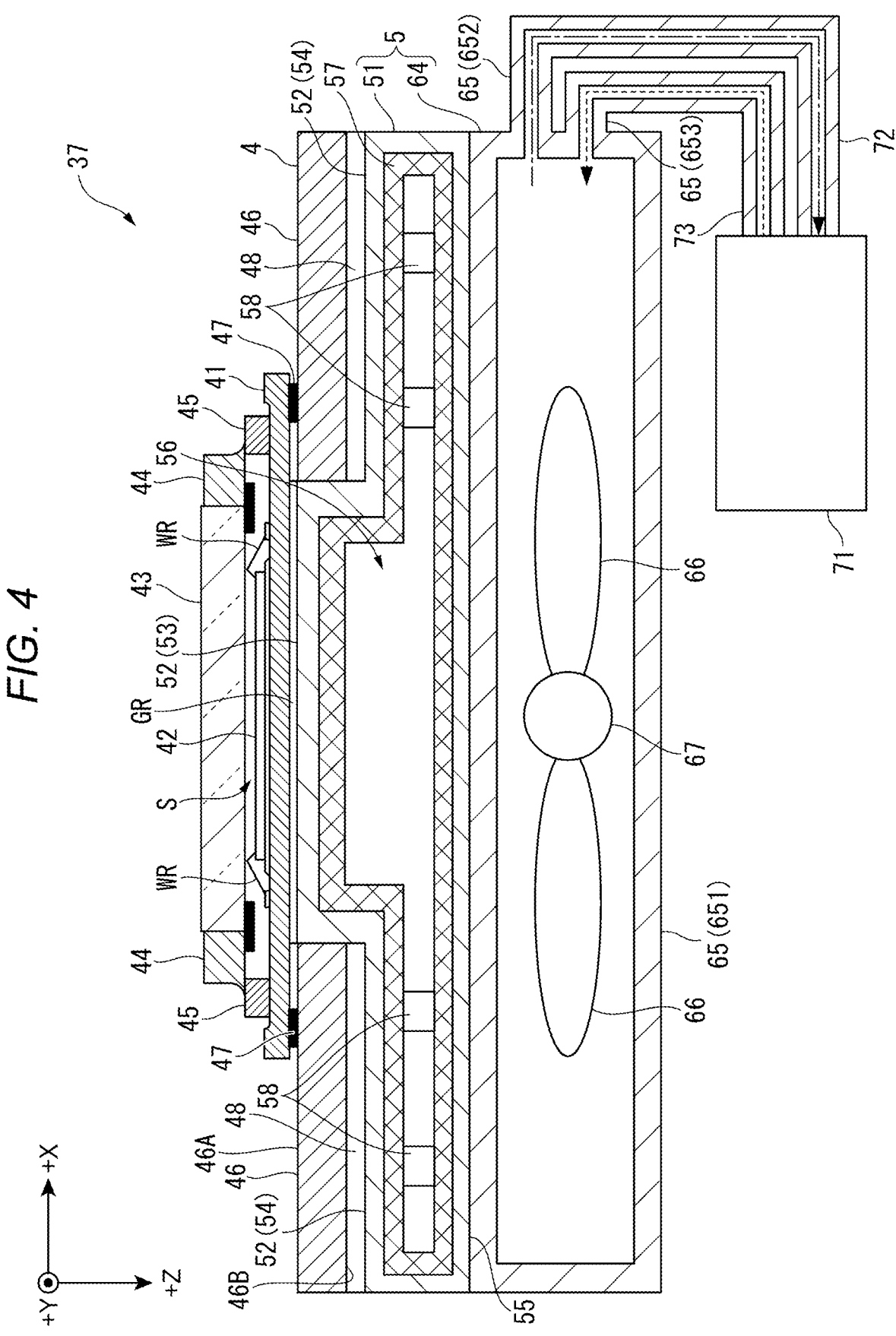
FIG. 4 is a cross-sectional view showing a display device provided to a projector according to a third embodiment.

FIG. 4 is a diagram showing a display device 37, a radiator 71, and pipes 72, 73 provided to the projector according to the present embodiment.

The projector according to the present embodiment has substantially the same configuration and functions as those of the projector 1 according to the first embodiment except the point that the projector according to the present embodiment is provided with the display device 37 shown in FIG. 4 instead of the display device 34, and is further provided with the radiator 71 and the plurality of pipes 72, 73.

The display device 37 is provided with substantially the same configuration and functions as those of the display device 34 except the point that the radiation member 64 is provided instead of the radiation member 59. In other words, in the present embodiment, the display device 37 is provided with the light modulator 4, and the cooler 5 which has the vapor chamber 51 and the radiation member 64.

It should be noted that it is possible for the display device 37 to be provided with the vapor chamber 61 related to the second embodiment instead of the vapor chamber 51 related to the first embodiment.

Configuration of Radiator and Pipes

The radiator 71, and the pipes 72, 73 will be described in advance.

The radiator 71 cools a cooling liquid flowing from the radiation member 64 via the pipe 72, and then supplies the cooling liquid thus cooled to the radiation member 59 via the pipe 73. The radiator 71 receives heat from the cooling liquid flowing therethrough, and then transfers the heat received in a cooling gas flowing due to a fan not shown. Thus, the radiator 71 cools the cooling liquid.

It should be noted that the cooling gas to which the heat is transferred by the radiator 71 is discharged outside the exterior housing 2.

Configuration of Radiation Member

Similarly to the radiation member 59, the radiation member 64 is coupled to the heat radiator 55 of the vapor chamber 51 in a thermally-transferable manner, and releases the heat transferred from the heat radiator 55. In particular, the radiation member 64 releases the heat transferred from the heat radiator 55 to the cooling liquid inflows into the radiation member 64. The radiation member 64 has a chassis 65, impellers 66, and a motor 67.

The chassis 65 has a liquid housing part 651, an outflow part 652, and an inflow part 653.

The liquid housing part 651 houses the cooling liquid, the impellers 66, and a part of the motor 67.

The outflow part 652 makes the cooling liquid in the liquid housing part 651 outflow to the outside when the impellers 66 are rotated by the motor 67.

The inflow part 653 makes the cooling liquid flowing from the outside inflow into the liquid housing part 651.

The outflow part 652 and the inflow part 653 are coupled to the radiator 71 via the plurality of pipes 72, 73 so that the cooling liquid can flow therebetween.

The impellers 66 are arranged inside the liquid housing part 651, and are rotated by the motor 67.

The heat transferred to the chassis 65 from the heat radiator 55 of the vapor chamber 51 is transferred to the cooling liquid in the liquid housing part 651. When the impellers 66 are rotated by the motor 67, the cooling liquid which is housed inside the liquid housing part 651, and to which the heat is transferred outflows from the outflow part 652 to the radiator 71 via the pipe 72. The heat transferred to the cooling liquid by the radiator 71 is transferred to the cooling gas flowing through the radiator 71. In other words, a part of the heat generated in the reflective light modulation element 42 is transferred to the cooling gas via the cooling liquid. Thus, the cooling liquid is cooled.

Regarding the cooling liquid cooled by the radiator 71, the cooling liquid flowing via the pipe 73 inflows into the liquid housing part 651 at the inflow part 653.

Due to such a radiation member 64, the heat generated in the reflective light modulation element 42, and then transferred to the vapor chamber 51 can efficiently be transferred to the cooling liquid. Therefore, it is possible to efficiently cool the reflective light modulation element 42.

It should be noted that the projector according to the present embodiment is provided with the three display devices 37, one of the display devices 37 modulates the red light beam R, another of the display devices 37 modulates the green light beam G, and the rest of the display devices 37 modulates the blue light beam B. The three radiation members 64 provided respectively to the three display devices 37 can be coupled to the radiator 71. In this case, the three radiation members 64 can be coupled in series to the radiator 71, or can also be coupled in parallel to the radiator 71.

Advantages of Third Embodiment

The projector according to the present embodiment described hereinabove exerts the following advantages in addition to the advantages substantially the same as those of the projector 1 according to the first embodiment.

In the display device 37, the radiation member 64 has the liquid housing part 651 which is disposed inside the radiation member 64, into which the cooling liquid inflows, and from which the cooling liquid outflows.

According to such a configuration, since it is possible to transfer the heat of the reflective light modulation element t 42 to the cooling liquid flowing into/out from the liquid housing part 651, it is possible to promote the condensation of the working fluid in the heat radiator 55 of the vapor chamber 51. Therefore, it is possible to promote the evaporation of the working fluid in the first area 53 and the second area 54 due to the heat transferred from the reflective light modulation element 42, and by extension, it is possible to increase the cooling efficiency of the reflective light modulation element 42.

Modifications of Embodiments

The present disclosure is not limited to each of the embodiments described above, but includes modifications, improvements, and so on in the range in which the advantages of the present disclosure can be achieved.

In each of the embodiments described above, it is assumed that the heat radiator 55 is disposed at the +Z direction side of the heat receiver 52 in the vapor chambers 51, 61. In other words, it is assumed that the heat radiator 55 is disposed on a surface at the +Z direction side in the vapor chambers 51, 61. However, this is not a limitation, it is possible for the heat radiator 55 to be disposed in other portions in the vapor chamber. Here, in the vapor chamber, since the heat radiator is disposed in a portion low in heat density, the heat radiator is apt to become a portion where the radiation member is disposed in the vapor chamber. Therefore, depending on the arrangement position of the radiation member in the vapor chamber, it is possible for the heat radiator to be disposed in other portions. For example, when the surface at the −Z direction side in the vapor chamber extends to an outer side of the light modulator 4 when viewed from the −Z direction, it is possible for the heat radiator to be disposed on a surface at the −Z direction side.

In each of the embodiments described above, it is assumed that the insertion target part 46C which is provided to the drive circuit board 46, and through which the first area 53 of the vapor chamber 51, 61 is inserted in the −Z direction is the through opening penetrating through the drive circuit board 46. However, this is not a limitation, and it is possible for the insertion target part 46C to be a cutout provided to an end portion of the drive circuit board 46. In other words, the insertion target part 46C is not necessarily required to be the through opening the periphery of which is surrounded.

In each of the embodiments described above, it is assumed that the inner surfaces 46C1 of the insertion target part 46C are coupled to the side surfaces 53B of the first area 53 in a heat-transferable manner. In other words, it is assumed that the drive circuit board 46 transfers a part of the heat of the reflective light modulation element 42 transferred to the drive circuit board 46 to the first area 53. However, this is not a limitation, and the drive circuit board 46 is not necessarily required to be coupled to the first area 53 in a thermally-transferable manner.

In each of the embodiments described above, it is assumed that the grease GR having thermal conductivity is disposed between the contact surface 41B of the base 41 and the coupling surface 53A of the first area 53 provided to the vapor chambers 51, 61. However, this is not a limitation, and the grease GR can be eliminated, and it is possible for the contact surface 41B and the coupling surface 53A to have direct contact with each other. Further, between the contact surface 41B and the coupling surface 53A, there can be disposed an adhesive for bonding the contact surface 41B and the coupling surface 53A to each other instead of the grease GR. In this case, the adhesive can be a thermally-conductive adhesive.

In each of the embodiments described above, it is assumed that the drive circuit board 46 transfers the heat to the second area 54 of the vapor chambers 51, 61 from the opposed surface 46B via the intervening member 48. However, this is not a limitation, and the heat is not required to be transferred to the second area 54 from the opposed surface 46B. Further, the intervening member 48 can be eliminated.

In each of the embodiments described above, it is assumed that the vapor chambers 51, 61 have the plurality of columnar parts 58 disposed in the fluid housing chamber 56, and the plurality of columnar parts 58 extend along the projection direction of the first area 53. Further, it is assumed that the plurality of columnar parts 58 are disposed in accordance with the second area 54, but are not disposed in the first area 53 when viewed form the −Z direction as the base 41 side. However, this is not a limitation, and the columnar parts 58 can be eliminated. Further, when the columnar parts 58 are disposed, the columnar parts 58 can be disposed in accordance with the first area 53 besides the second area 54, and are not required to be disposed in a portion corresponding to the second area 54.

In each of the embodiments described above, it is assumed that the distance between the first area 53 and the contact surface 41B is shorter than the distance between the second area 54 and the opposed surface 46B. However, this is not a limitation, and as long as the heat can be transferred from the contact surface 41B to the first area 53, the distance between the first area 53 and the contact surface 41B is not required to be shorter than the distance between the second area 54 and the opposed surface 46B.

In the first and second embodiments described above, it is assumed that the radiation member 59 is the heatsink having the plurality of fins 591. In the third embodiment described above, it is assumed that the radiation member 64 is a member for transferring the heat transferred from the vapor chambers 51, 61 to the cooling liquid in the liquid housing part 651 disposed inside. However, this is not a limitation, and the configuration of the radiation member to be coupled to the heat radiator 55 of the vapor chambers 51, 61 in a thermally-transferable manner is not limited to the above. For example, the radiation member 64 is not required to be provided with the impellers 66 and the motor 67, and is not required to be provided with the outflow part 652 and the inflow part 653.

In each of the embodiments described above, it is assumed that the display devices 34, 36, and 37 are applied to the projector 1. However, this is not a limitation, and the display device according to the present disclosure can be adopted in electronic equipment other than the projector, or can be used as an independent display device.

Conclusion of Present Disclosure

Hereinafter, the conclusion of the present disclosure will additionally be described.

A display device according to an aspect of the present disclosure includes a base having a first surface, and a second surface at an opposite side to the first surface, a reflective light modulation element disposed on the first surface, and electrically coupled to the base, a drive circuit board having a third surface electrically coupled to the second surface, and a fourth surface at an opposite side to the third surface, and configured to drive the reflective light modulation element, a vapor chamber having a heat receiver configured to receive heat transferred from an outside, a heat radiator configured to radiate heat, and a fluid housing chamber configured to house a working fluid which changes from a liquid phase to a vapor phase due to the heat received by the heat receiver, and changes from the vapor phase to the liquid phase in the heat radiator, and a radiation member coupled to the heat radiator in a thermally-transferable manner, wherein the heat receiver has a first area opposed to the second surface, and a second area opposed to the fourth surface, and the first area projects toward the base side from the second area, and is coupled to the second surface in a thermally-transferable manner.

According to such a configuration, the heat generated in the reflective light modulation element is transferred to the base on which the reflective light modulation element is disposed. The heat transferred to the base is transferred to the first area coupled to the second surface of the base in a thermally-transferable manner in the vapor chamber. Since the fluid housing chamber of the vapor chamber houses the working fluid, the working fluid in the liquid phase evaporates due to the heat transferred to the first area in the portion corresponding to the first area in the fluid housing chamber. Since the working fluid in the vapor phase increases in volume to be diffused inside the fluid housing chamber, the heat transferred to the first area is diffused inside the fluid housing chamber. The working fluid in the vapor phase is condensed on the inner surface of the heat radiator coupled to the radiation member to change to the working fluid in the liquid phase, and the working fluid in the liquid phase is transported once again to the portion corresponding to the first area in the fluid housing chamber.

Since the heat of the reflective light modulation element is diffused by the vapor chamber as described above, it is possible to effectively lower the heat density of the reflective light modulation element. On this occasion, since the heat radiator of the vapor chamber is provided with the radiation member, it is possible to efficiently transfer the heat of the reflective light modulation element to the radiation member using the vapor chamber. Therefore, it is possible to effectively cool the reflective light modulation element. Further, since the configuration of the vapor chamber is a configuration of confining the working fluid, it is possible to suppress an increase in size of the display device.

It should be noted that the term "opposed" used in "a first area opposed to the second surface" and "a second area opposed to the fourth surface" is not limited to when being directly opposed, but includes when an intervening object exists.

In the aspect described above, the drive circuit board may have an insertion target part corresponding to the reflective light modulation element, and the first area may be inserted through the insertion target part to be coupled to the second surface in a thermally-transferable manner.

According to such a configuration, even when the vapor chamber is arranged at an opposite side to the base with respect to the drive circuit board, it is possible to couple the first area of the vapor chamber to the second surface of the base in a thermally-transferable manner. Therefore, it is possible to efficiently transfer the heat of the reflective light modulation element transferred to the second surface to the vapor chamber, and thus, it is possible to effectively cool the reflective light modulation element.

In the aspect described above, the drive circuit board may receive the heat generated in the reflective light modulation element with the third surface via the second surface, and then transfer the heat received to the first area with a portion opposed to the first area in the insertion target part.

According to such a configuration, the heat of the reflective light modulation element is not only transferred to the portion opposed to the base in the first area via the base, but also transferred to the portion opposed to the insertion target part in the first area. According to the above, since it is possible to increase the paths through which the heat is transferred from the reflective light modulation element to the first area, it is possible to more efficiently transfer the heat of the reflective light modulation element to the first area. Therefore, it is possible to more effectively cool the reflective light modulation element.

In the aspect described above, there may further be included a light transmissive member which is opposed to an image exit surface of the reflective light modulation element, and which is disposed at an opposite side to the base with respect to the reflective light modulation element, and a support frame which is configured to support the light transmissive member, and which is provided to the base, wherein the vapor chamber may be coupled to the support frame in a thermally-transferable manner to receive the heat generated in the reflective light modulation element.

According to such a configuration, it is possible to transfer the heat which is generated in the reflective light modulation element, and is transferred to the light transmissive member to the vapor chamber via the support frame. Therefore, since it is possible to increase the paths of the heat transferred form the reflective light modulation element to the vapor chamber, it is possible to more effectively cool the reflective light modulation element.

In the aspect described above, there may further be included grease which has thermal conductivity, and which is disposed between the second surface and a portion opposed to the second surface in the first area.

According to such a configuration, even when a gap occurs between the second surface of the base and the first area of the vapor chamber, it is possible to make it easy for the heat to be transferred from the second surface to the first area due to the grease. Therefore, since it is possible to efficiently cool the heat of the reflective light modulation element to the vapor chamber, it is possible to more effectively cool the reflective light modulation element.

In the aspect described above, the drive circuit board may receive the heat generated in the reflective light modulation element with the third surface via the second surface, and then transfer the heat received to the second area of the vapor chamber from the fourth surface.

According to such a configuration, in the vapor chamber, the heat of the reflective light modulation element is transferred to the first area via the base, and further, the heat of the reflective light modulation element is transferred to the second area via the base and the drive circuit board. Therefore, since it is possible to increase the paths of the heat transferred form the reflective light modulation element to the vapor chamber, it is possible to more effectively cool the reflective light modulation element.

In the aspect described above, the vapor chamber may have a plurality of columnar parts which are disposed in the fluid housing chamber, and which couple an inner surface corresponding to the heat receiver and an inner surface corresponding to the heat radiator to each other, and the plurality of columnar parts may be disposed in accordance with the second area.

According to such a configuration, the strength of the vapor chamber in which the working fluid evaporates and condenses can be ensured by the plurality of columnar parts.

It should be noted that in the portion where the plurality of columnar parts are disposed in the vapor chamber, it is difficult to make the flatness smaller. In other words, unevenness is apt to occur in the portion where the plurality of columnar parts are disposed in the vapor chamber. In contrast, since the portion where the plurality of columnar parts are disposed in the vapor chamber is the second area, it is possible to make it easy to make the flatness of the first area opposed to the second surface of the base smaller. Therefore, it is possible to enlarge the contact area between the second surface and the first area, and thus, it is possible to efficiently transfer the heat of the reflective light modulation element from the second surface to the first area.

In the aspect described above, a distance between the first area and the second surface may be shorter than a distance between the second area and the fourth surface.

According to such a configuration, since the columnar part is not disposed in the first area, even when manufacturing the plurality of columnar parts, the flatness of the first area does not degrade. Therefore, it is possible to make it easy to couple the first area to the second surface in a thermally-transferable manner. Therefore, it is possible to make it easy to transfer the heat from the reflective light modulation element to the first area via the base.

In the aspect described above, the radiation member may have a plurality of fins.

According to such a configuration, since it is possible to enlarge the radiation area of the heat transferred from the vapor chamber, it is possible to promote the condensation of the working fluid on the sixth surface of the vapor chamber. Therefore, it is possible to promote the evaporation of the working fluid in the first area due to the heat transferred from the reflective light modulation element, and by extension, it is possible to increase the cooling efficiency of the reflective light modulation element.

In the aspect described above, the radiation member may have a liquid housing part which is disposed inside the radiation member, into which the cooling liquid inflows, and from which the cooling liquid outflows.

According to such a configuration, since it is possible to transfer the heat of the reflective light modulation element to the cooling liquid flowing into/out from the liquid housing part, it is possible to promote the condensation of the working fluid in the heat radiator of the vapor chamber. Therefore, it is possible to promote the evaporation of the working fluid in the first area due to the heat transferred from the reflective light modulation element, and by extension, it is possible to increase the cooling efficiency of the reflective light modulation element.

What is claimed is:

1. A display device comprising:
    a base having a first surface, and a second surface at an opposite side to the first surface;
    a reflective light modulator disposed on the first surface, and electrically coupled to the base;
    a drive circuit board having a third surface electrically coupled to the second surface, and a fourth surface at an opposite side to the third surface, and configured to drive the reflective light modulator;
    a vapor chamber having a heat receiver configured to receive heat transferred from an outside, a heat radiator configured to radiate heat, and a fluid housing chamber configured to house a working fluid which changes from a liquid phase to a vapor phase due to the heat received by the heat receiver, and changes from the vapor phase to the liquid phase in the heat radiator; and a heatsink coupled to the heat radiator in a thermally-transferable manner, wherein the heat receiver has a first area opposed to the second surface, and a second area opposed to the fourth surface, and the first area projects toward the base side from the second area, the first area has a coupling surface at the base side that is coupled to the second surface in a thermally-transferrable manner, the coupling surface being a flat surface, the vapor chamber has a plurality of columnar parts which are disposed in the fluid housing chamber, and which couple an inner surface corresponding to the heat receiver and an inner surface corresponding to the heat radiator to each other, the plurality of columnar parts are disposed in accordance with the second area, and the plurality of columnar parts are not disposed in accordance with the first area.

2. The display device according to claim 1, wherein the drive circuit board has an insertion target part corresponding to the reflective light modulator, and the first area is inserted through the insertion target part to be coupled to the second surface in a thermally-transferable manner.

3. The display device according to claim 2, wherein the drive circuit board receives the heat generated in the reflective light modulator with the third surface via the second surface, and then transfers the heat received to the first area with a portion opposed to the first area in the insertion target part.

4. The display device according to claim 1, further comprising:

a light transmissive plate which is opposed to an image exit surface of the reflective light modulator, and which is disposed at an opposite side to the base with respect to the reflective light modulator; and a support frame which is configured to support the light transmissive plate, and which is provided to the base, wherein the vapor chamber is coupled to the support frame in a thermally-transferable manner to receive the heat generated in the reflective light modulator.

5. The display device according to claim 1, further comprising:

grease which has thermal conductivity, and which is disposed between the second surface and a portion opposed to the second surface in the first area.

6. The display device according to claim 1, wherein the drive circuit board receives the heat generated in the reflective light modulator with the third surface via the second surface, and then transfers the heat received to the second area of the vapor chamber from the fourth surface.

7. The display device according to claim 1, wherein a distance between the first area and the second surface is shorter than a distance between the second area and the fourth surface.

8. The display device according to claim 1, wherein the heatsink has a plurality of fins.

9. The display device according to claim 1, wherein the heatsink has a liquid housing part which is disposed inside the heatsink, into which the cooling liquid inflows, and from which the cooling liquid outflows.

* * * * *